Dec. 30, 1969   P. A. M. LÉGER   3,487,424
REFRIGERATION LIQUEFACTION DEVICE
Filed April 29, 1968   11 Sheets-Sheet 1

Inventor:
Pierre Andre Marcel Leger
By Baldwin Wight Diller & Brown
Attorneys

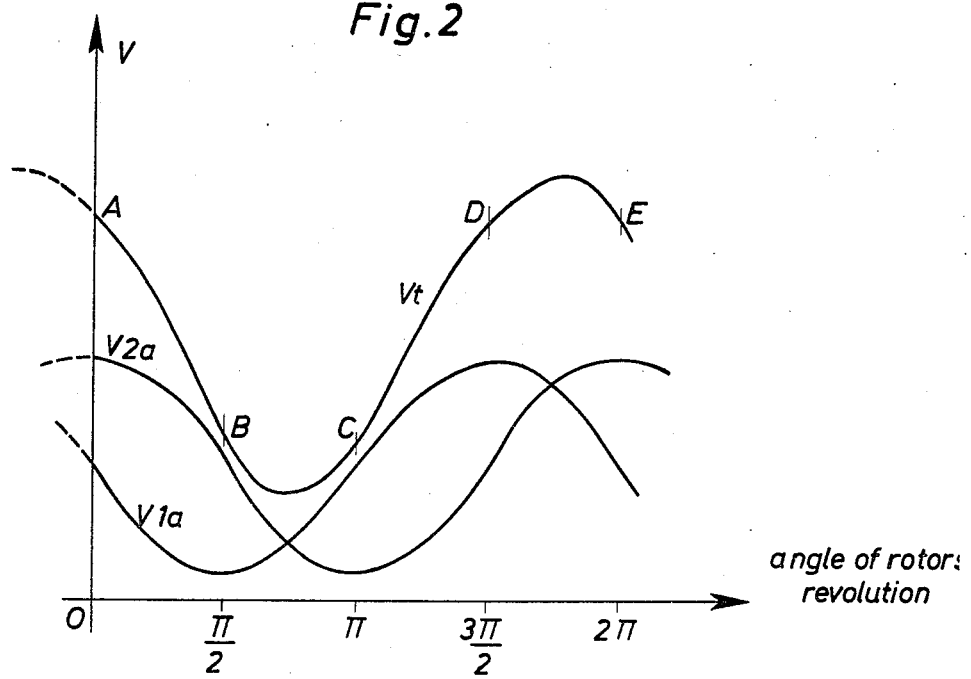
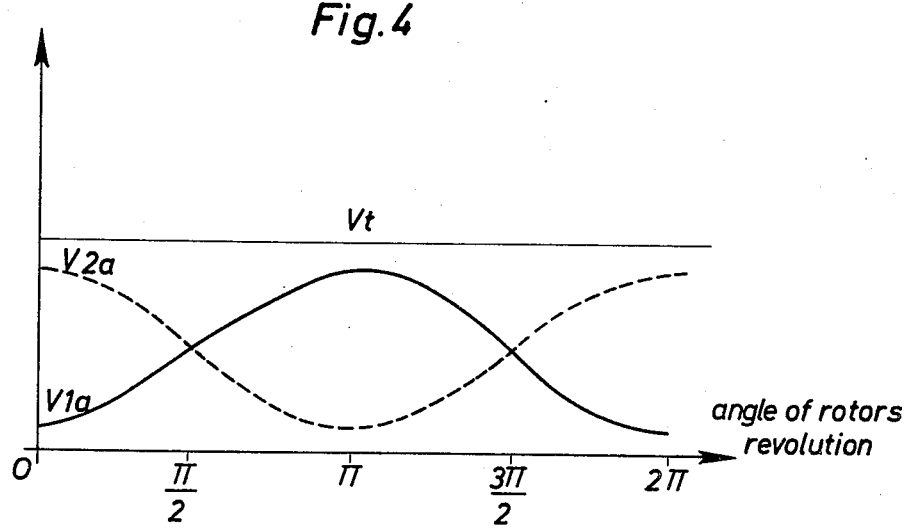

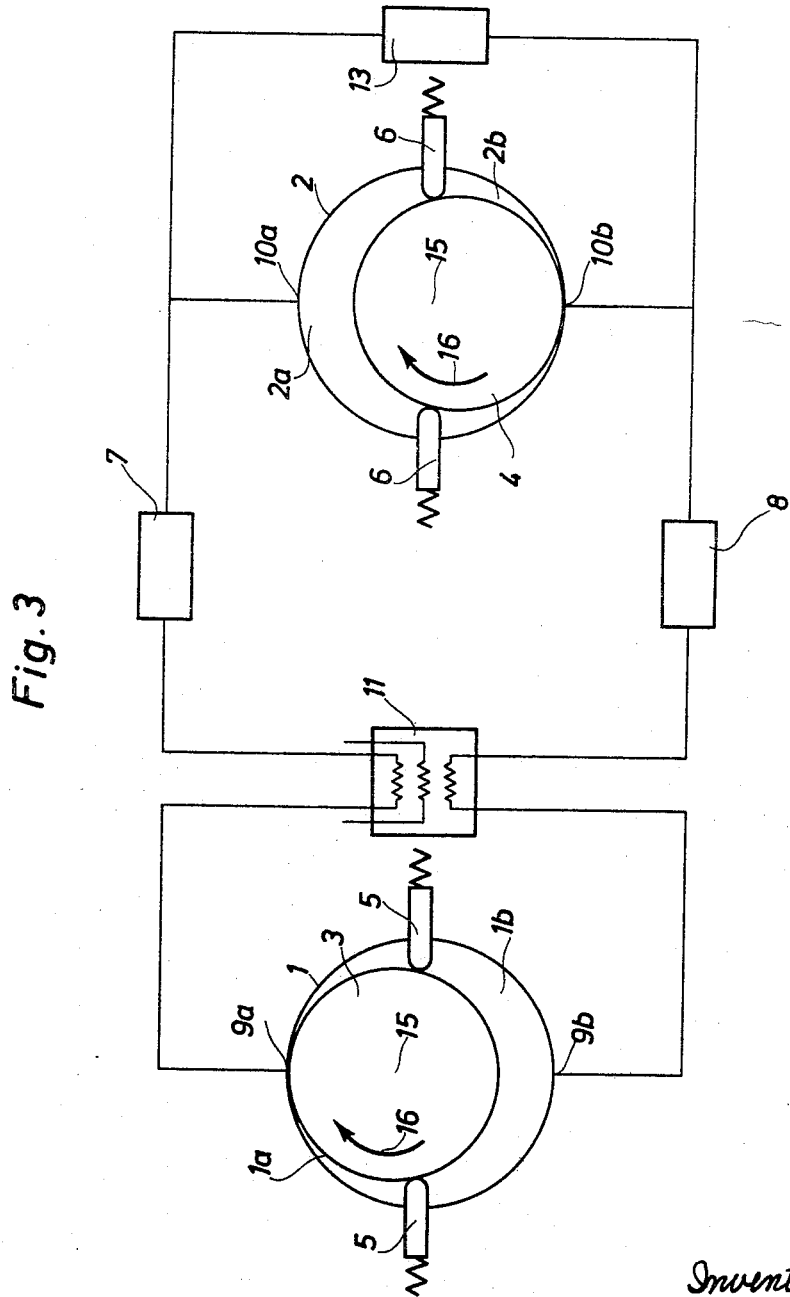

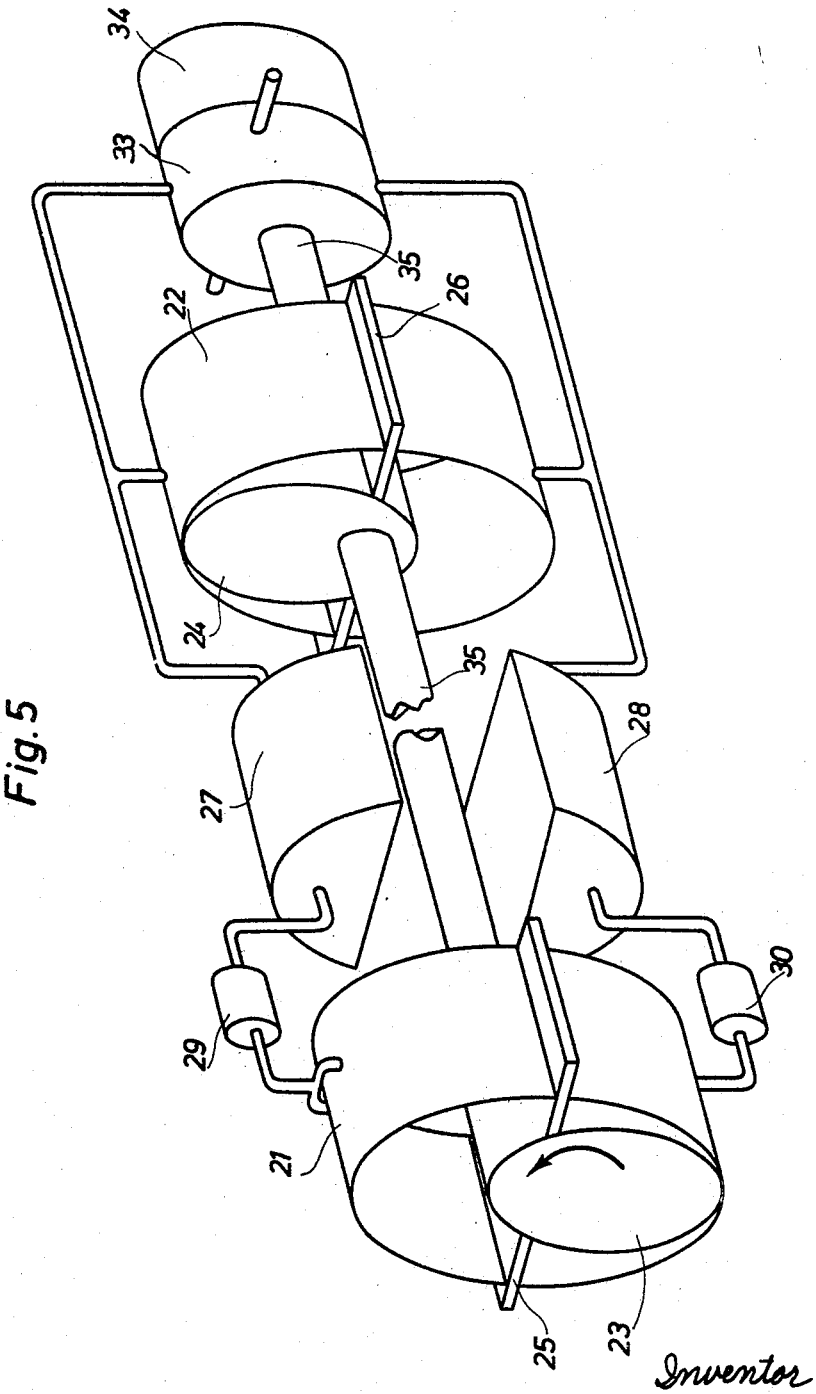

Dec. 30, 1969     P. A. M. LÉGER     3,487,424
REFRIGERATION LIQUEFACTION DEVICE
Filed April 29, 1968     11 Sheets-Sheet 6

Inventor:
Pierre Andre Marcel Leger
By Baldwin Wight Diller & Brown
Attorneys

Dec. 30, 1969  P. A. M. LÉGER  3,487,424
REFRIGERATION LIQUEFACTION DEVICE
Filed April 29, 1968  11 Sheets-Sheet 8

Inventor:
Pierre André Marcel Léger
By Baldwin Wight Diller & Brown
Attorneys

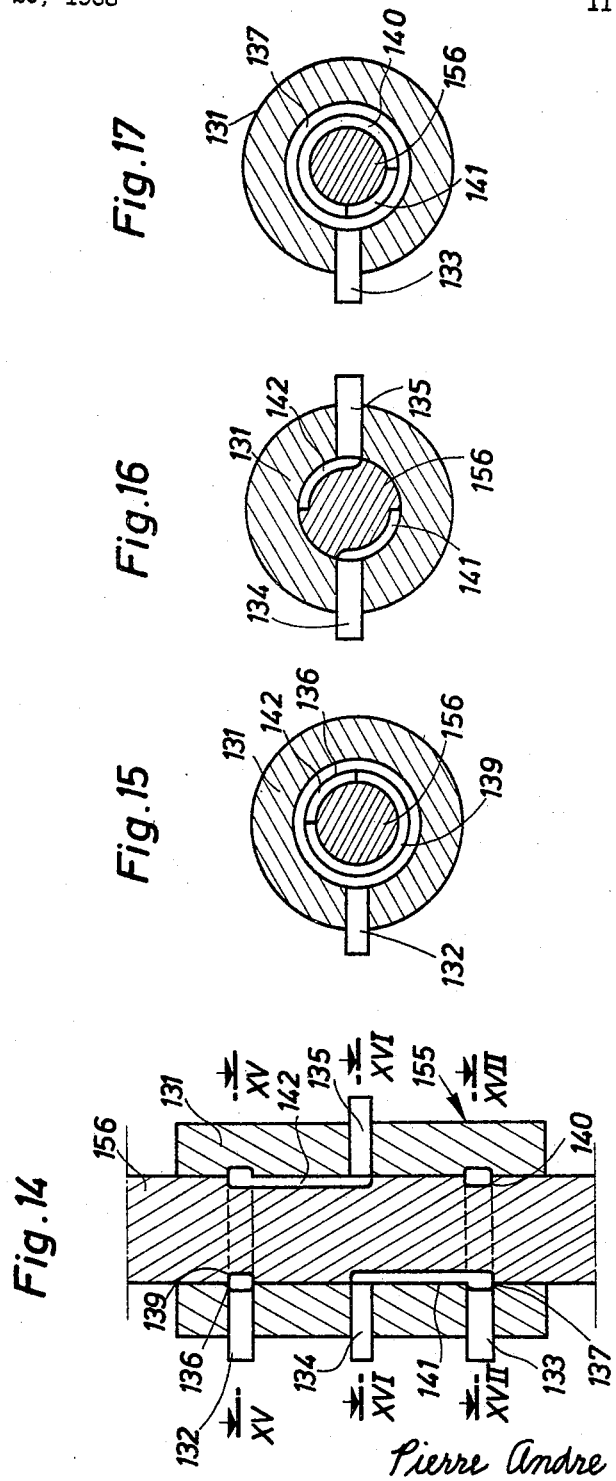

United States Patent Office 3,487,424
Patented Dec. 30, 1969

3,487,424
REFRIGERATION LIQUEFACTION DEVICE
Pierre André Marcel Léger, Massy, France, assignor to Societe Anonyme: Societe Alsacienne de Constructions Atomiques de Telecommunications et d'Electronique Alcatel, Paris, France, a corporation of France
Filed Apr. 29, 1968, Ser. No. 725,103
Claims priority, application France, May 5, 1967, 105,461
Int. Cl. F25b 9/00
U.S. Cl. 62—6                    9 Claims

ABSTRACT OF THE DISCLOSURE

The invention relates to a refrigeration method and apparatus in which the compression and the expansion respectively cold and warm chambers of variable volume are connected periodically, thus forming two independent circuits which operate in cyclical shifted phases and provide continuously either cooling of a thermal load or liquefaction of a gas.

---

The present invention relates to improvements in refrigeration apparatus and more particularly to a refrigeration and/or liquefaction device using gas expansion.

In some known devices for refrigeration and/or liquefaction, use is made of various thermodynamic cycles and especially of the Stirling cycle.

The refrigeration systems using the Stirling cycle essentially comprise a compressor and an expander, or pressure-reducer, combined within a single cylinder provided with a piston and a displacing member. The gas is compressed between the piston and displacing member and allowed to expand between said member and the closed cylinder end. The amount of gas within the device is substantially constant and is merely subjected to alternate pulsations between the expansion space and the compression space from one exchanger side to the other. The exchanger used is of the intermittent flow type, while in the other systems it is usually of the counter-current flow type. Said exchanger is called a regenerator and is of higher efficiency than the counter-current type exchanger.

The application of the Stirling cycle to the construction of refrigeration and/or liquefaction apparatus is well known.

For example, the piston may be replaced by a unit consisting of a compressor and a set of high pressure-low pressure valves having their opening movement related to the motion of the displacer.

Devices of such design may even include two or more stages, whereby very low temperatures can be reached.

These devices are of the reciprocating type and have a number of drawbacks. In particular, they are subjected to detrimental vibrations which are transmitted to the whole apparatus.

Moreover, the forces developed by inertia in the displacer as a result of the repeated speed variations of the reciprocating motion cause a limit to the refrigerating power of a given device.

On the other hand, the coolest stages are subjected through their displacers to ambient temperature. Therefore to improve thermal insulation, the displacer length has to be increased by an amount all the more great as the difference in temperature between the two spaces is higher. This requirement raises a particularly difficult thermal insulation problem.

Finally, in the case of a liquefaction device, a series of counter-current exchangers must be provided in parallel and their poor efficiency will seriously impair the overall thermal balance.

The present invention allows these drawbacks to be obviated by means of refrigeration and liquefaction methods and devices capable of rapidly providing very low temperatures, while improving the overall thermal efficiency.

The invention provides a refrigeration and/or liquefaction method which consists in using at least two cylindrical rooms whereof one, referred to as cold cylindrical room or vessel, is held at a low temperature, while the other, referred to as warm cylindrical room, is at a substantially ambient temperature, each room being permanently divided into at least two chambers of variable volume by means of eccentric members which have their axes driven in a rotational motion and cooperate with a partitioning system, each warm chamber being connected to at least one cold chamber through a regenerator system, the gas being moved from each warm (or cold) chamber to at least one cold (or warm) chamber by simultaneous variation of the corresponding chamber volumes, thereby forming at least two independent circuits which operate in a cyclical phase-shifted manner and cooperate together to provide the substantially continuous cooling of a thermal load, or the liquefaction of a given amount of gas.

According to a first embodiment of the method of the invention, using a Stirling thermodynamic cycle, the gas compression and expansion are effected in a closed circuit by means of a suitable angular setting of the eccentric members about the common driving shaft.

According to a second embodiment of the method of the invention, the gas compression and expansion are effected through a distributor member adapted to periodically connect the cylindrical capacities with the upstream side and downstream side of a compressor member.

A device for applying the first embodiment of the method according to the invention comprises essentially at least two cylindrical rooms, viz. a warm cylindrical room and a cold cylindrical room, wherein two eccentric rotors in shifted angular relationship are mounted on a common driving shaft and cooperate with movable blades to effect fluid-tight division of said cylindrical rooms into at least two chambers of variable volumes, one chamber of the warm cylindrical room being connected to one chamber of the cold cylindrical room through a regenerator so that at least two independent circuits are provided.

According to a preferred embodiment of this device, the two eccentric rotors are mounted on the common driving shaft with a 90° angular shift.

The same result may be obtained by keeping the two rotors in phase, while providing a 90° angular shift between the blades.

A device for applying the second embodiment of the method according to the invention comprises at least two cylindrical rooms, viz one warm cyclindrical room and one cold cylindrical room, wherein two eccentric rotors in shifted angular relationship are mounted on a common driving shaft and cooperate with movable blades to effect fluid-tight division of said cylindrical rooms into at least two chambers of variable volumes, one chamber of the warm cyindrical room being in communication with one chamber of the cold cylindrical room through a regenerator, so that at least two independent circuits are provided, each circuit being adapted for alternate connection to a high pressure source and a low pressure source, by means of a timer or distributor at a suitable angular setting on the rotor driving shaft.

According to a preferred feature of this device, the two eccentric rotors are mounted on a common driving shaft with a 180° angular shift. The same result may be obtained by keeping the two rotors in phase while intercrossing the ducts between the chambers.

Another device for applying the second embodiment of the method according to the invention comprises a warm cylindrical room and three cold cylindrical rooms at re-respective $T_2$, $T_3$, $T_4$ temperatures such that $$T_2 > T_3 > T_4$$

whereby the sum of the volumes of the warm cylindrical room and of the three cold cylindrical rooms is constant, and the three rotors of the cold cylindrical rooms are all in phase and shifted by 180° with respect to the rotor of the warm cylindrical room.

The movable blades used in the devices for carrying into effect the two embodiments of the method according to the invention to effect division of a cylindrical room into two independent chambers are mounted within the stator and urged by springs into permanent engagement with the rotor, whereby ports are provided in diametrically opposed points of the stator to put said chambers into communication with the remainder of the device.

In another device for applying the two embodiments of the invention method, the movable blades and springs therefor are mounted within the rotor and permanently applied against the stator, the connection ports for the two chambers being then provided in the rotor.

The liquefaction devices for applying the present methods comprise, in direct connection with the coldest refrigeration stage, a final liquefaction stage of the counter-current exchanger type.

Such devices have a number of advantages.

One of said advantages is that, due to the high rotational speed, very low temperatures can be reached rapidly.

A second advantage results from the fact that, since the temperatures in the two chambers of one same cylindrical room are equal, there is no thermal insulation problem in the selection of the blade-forming materials, since the blades merely act to ensure fluid-tightness between the two chambers of the same cylindrical room.

A further advantage lies in the fact that, in the case of a liquefaction device, no series of counter-current exchangers has to be added, so that the overall thermal efficiency may be kept at a high value.

Still another advantage is that the apparatus is of "linear" design, so that the coldest stages are not subjected to ambient temperatures; thus, the stage at temperature $T_3$ lies between the stage at temperature $T_4$ and the stage at temperature $T_2$.

A more detailed description of the invention is given in the following examples, with reference to the accompanying drawings and diagrams, wherein:

FIG. 2 shows the variations in the chamber volumes of the device according to FIGURE 1 during one cycle;

FIG. 3 is a diagrammatic view of a device for applying the second embodiment of the method;

FIG. 4 shows the variations in the chamber volumes of the device according to FIGURE 3 during one cycle;

FIG. 5 is a perspective view of a device for applying the second embodiment of the method;

Figure 8:
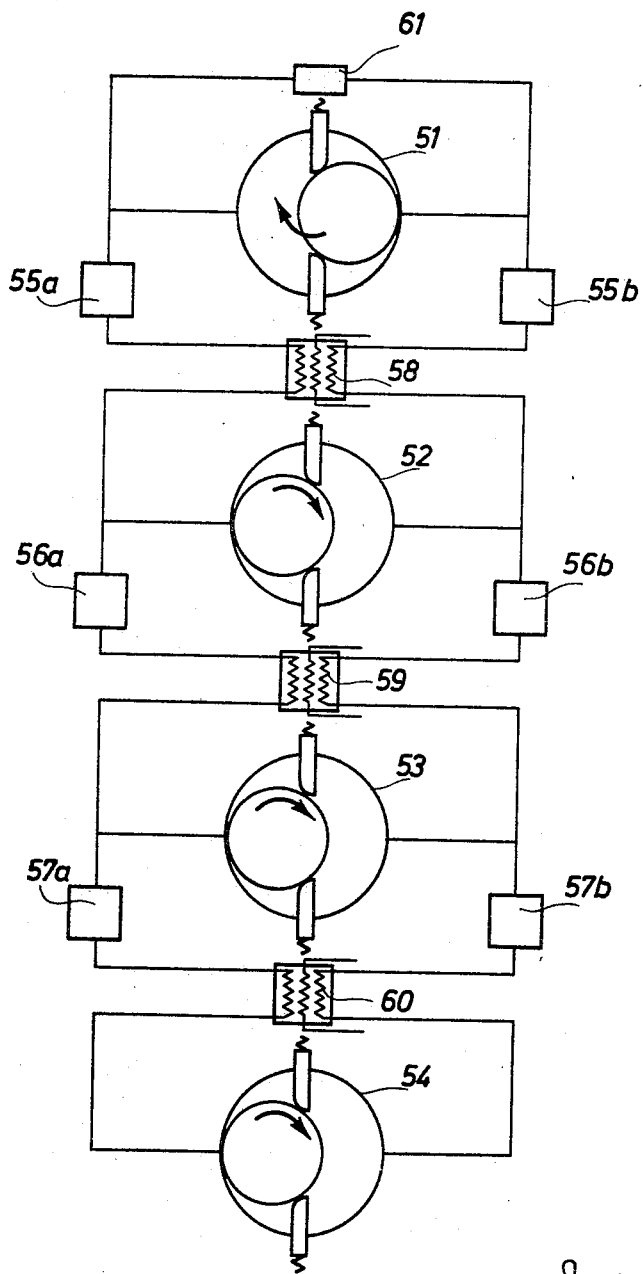
Figure 9:
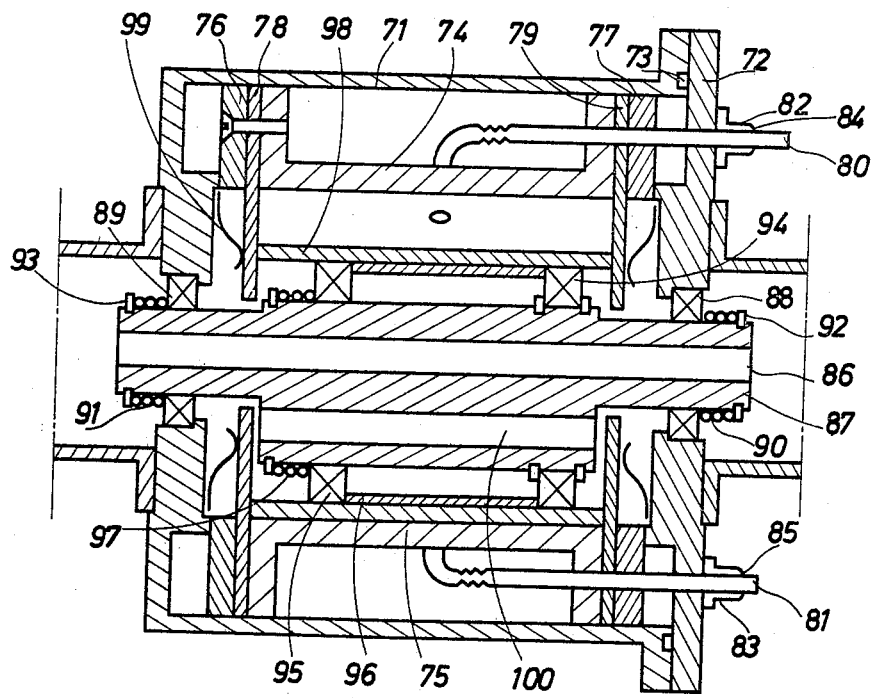
Figure 10:
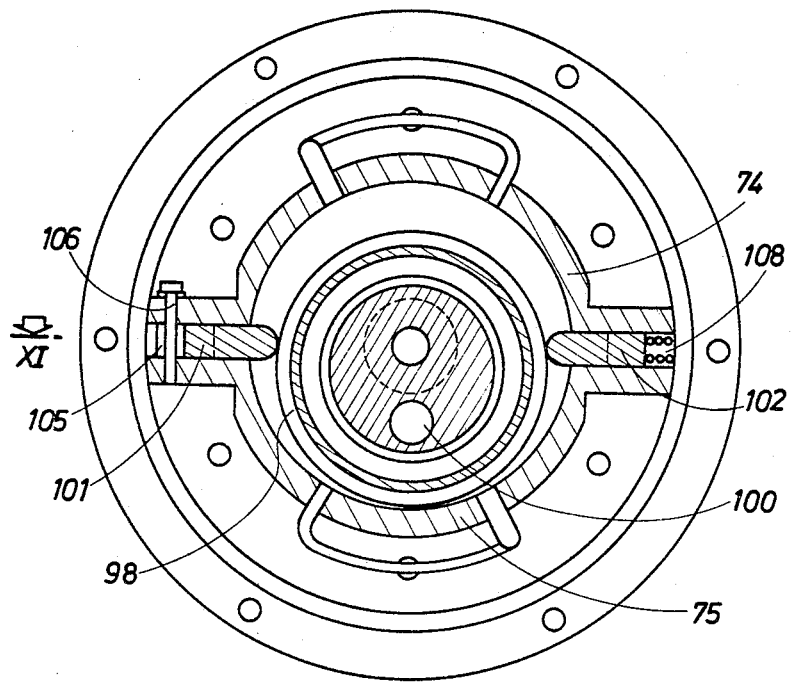
Figure 11:
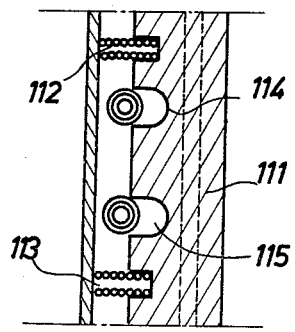
Figure 12:
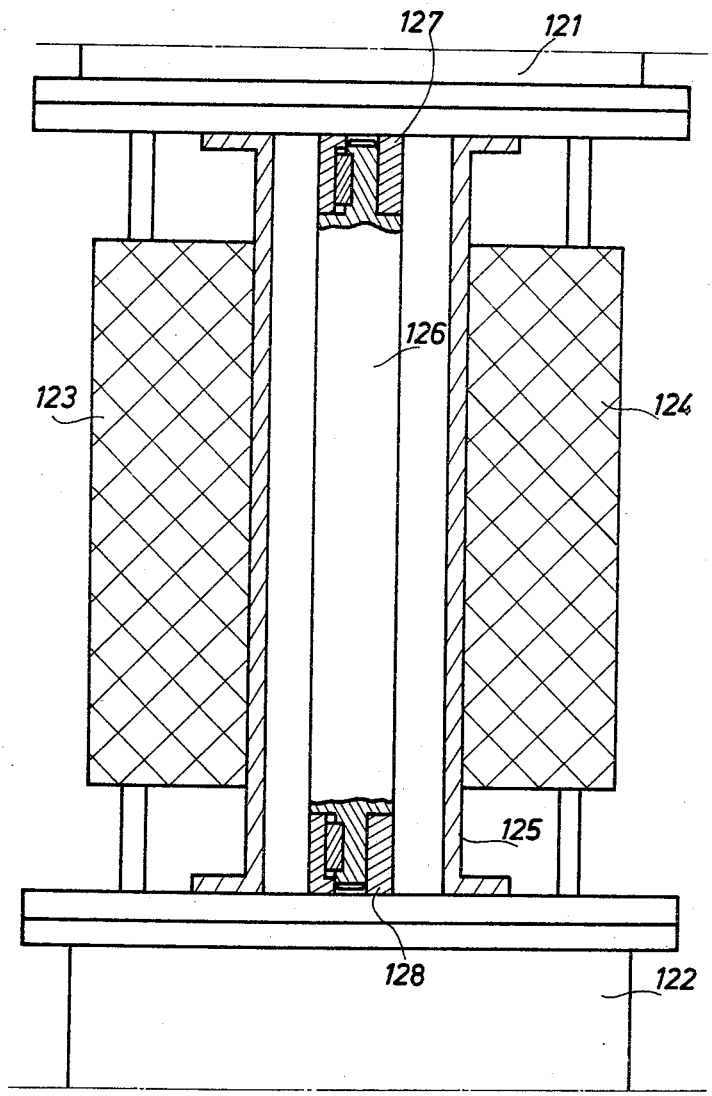
Figure 13:
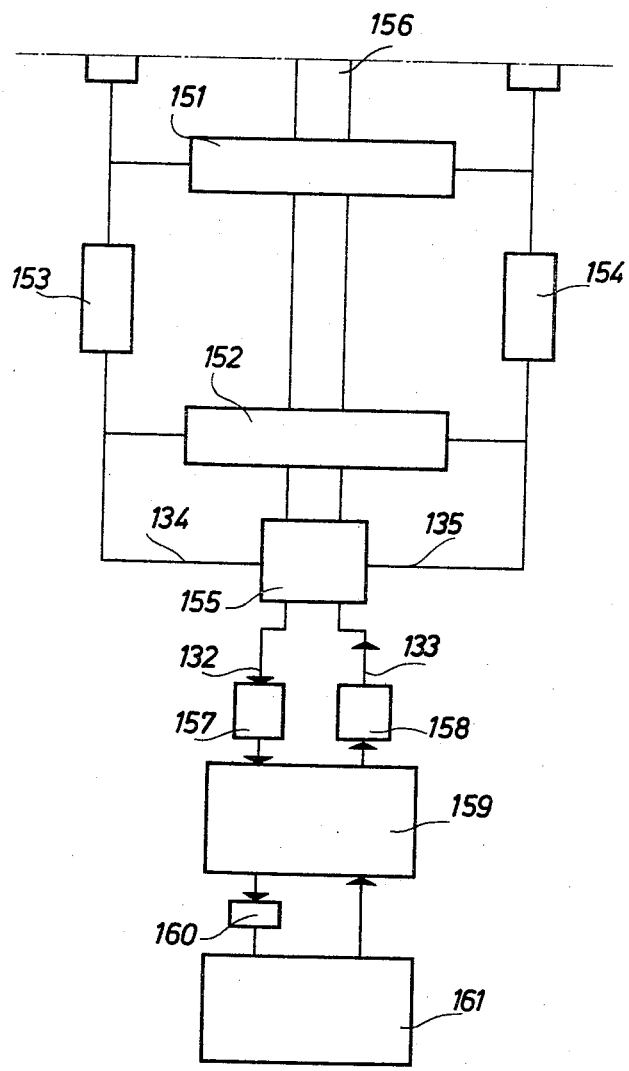

FIGS. 6 and 7a, 7b, 7c diagrammatically show various modified rotors used in the devices for applying the two embodiments of the method;

FIG. 8 is a diagrammatic view of a device with three refrigeration stages for applying the second embodiment of the method;

FIG. 9 is a first view of a cylindrical room and of the revolving system;

FIG. 10 is a second view of a cylindrical room and of the revolving system;

FIG. 11 is a view of the blades;

FIG. 12 is a view of a regenerator connecting two cylindrical rooms;

FIG. 13 is a diagrammatic view of the final liquefaction stage used in the liquefaction devices for applying the two embodiments of the method according to the invention;

FIG. 14 shows the timing member corresponding to FIGURE 13;

FIG. 15 is a cross-sectional view along line X–X' of the timer in FIGURE 14;

FIG. 16 is a cross-sectional view along line Y–Y' of the timer in FIGURE 14;

FIG. 17 is a cross-sectional view along line Z–Z' of the timer in FIGURE 14.

Figure 1:
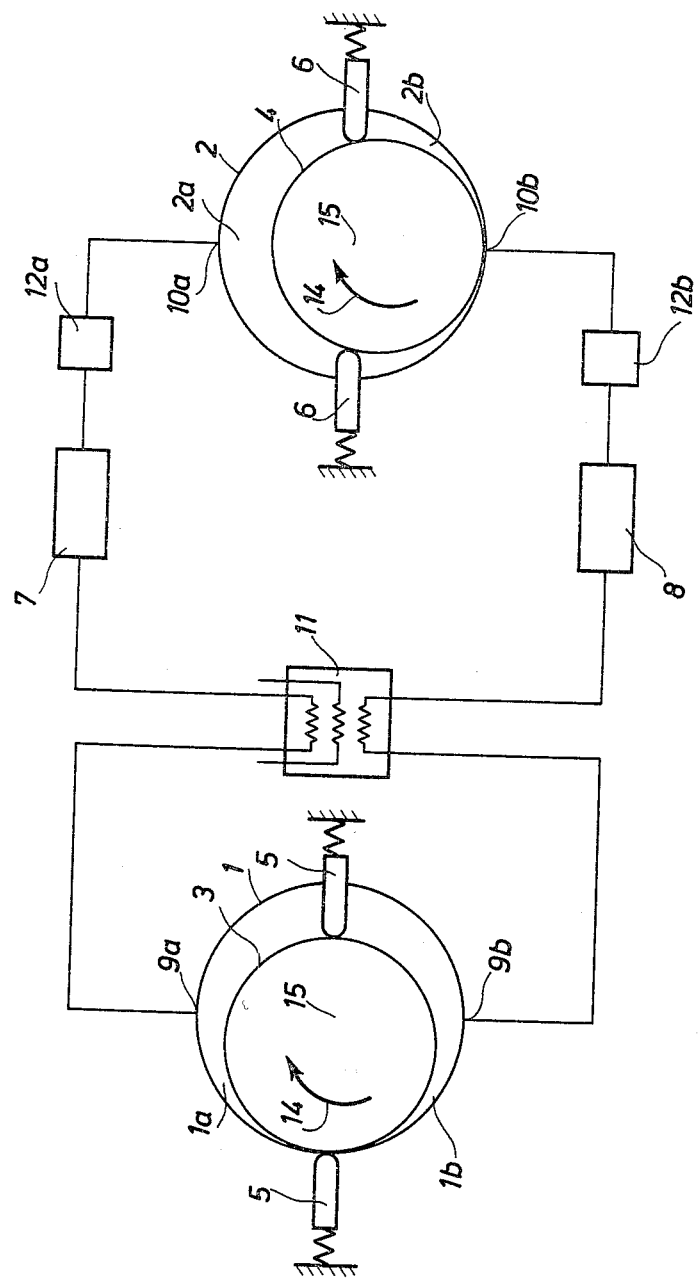
FIG. 1 is a diagrammatical view of a device for carrying into effect the first embodiment of the methods.

Referring to FIGURE 1, a refrigeration system for applying the first embodiment of the method comprises two cylindrical rooms 1, 2 where cylindrical rooms 1, 2 wherein two rotors 3, 4 are movable about axes offset with respect to those of the cylindrical rooms. The revolving motion is about the axis 15 common to both cylinders. The angular shift between the two rotors is of 90. Blades 5, 6 linked to the stator are held by springs/constant engagement with the rotors, thus divising each cylindrical room into two chambers, 1a, 1b and 2a, 2b respectively.

Two regenerators 7, 8 are connected with the cylindrical rooms through ports 9a, 10a and 9b, 10b respectively.

As shown, the thermal load 11 is disposed between the regenerators and the cylindrical room 1, in practice, said load can advantageously surround the cold cylinder.

Two devices 12a, 12b for removing the compression heat are located between the regenerators and the cylindrical room 2.

The operation of the device is as follows: the two rotors are initially in the positions shown in FIGURE 1 and are revolving in the direction shown by the arrows 14 about axis 15. During the first 90° of revolution of the rotors, the volumes of chambers 1a, 2a will be reduced by the same amount, which results in a compression of the gases. During the further 90° of revolution, the volume of chamber 1a will increase by a given amount, while the volume of chamber 2a will decrease by an equal amount. The result is a gas transfer from chamber 2a to chamber 1a. During this transfer, the gas flows through heat-removing device 12a where it leaves its compression heat, then through regenerator 7 where it is cooled, then through thermal load 11 and finally into chamber 1a.

During the third quarter of revolution, the volumes of chambers 1a, 2a will increase by the same amount. The result is an expansion and cooling of the gases in chamber 1a.

During the fourth quarter of revolution, bringing the rotors back to their initial positions, the volume of chamber 1a will decrease by a given amount, while the volume of chamber 2a will increase by an equal amount. The result is a gas transfer from chamber 1a to chamber 2a.

During this transfer, the gas flows through the thermal load 11 where it leaves part of the heat resulting from its expansion, then through the regenerator 7 where it leaves the remainder of its heat.

The operation of the second circuit portion, consisting of the chambers 1b, 2b, regenerator 8, thermal load 11 and heat removing device 12b is in all respects identical, but with a 180° shifting relatively to the first circuit portion.

FIGURE 2 represents the variations in the volume of chamber 1a (curve V1a), the volume of chamber 2a (curve V2a) and in the sum of said volumes (curves Vt), as a function of the angular positions of the rotors. It will be appreciated that the portion of curve Vt from points A to B corresponds to the compression stage and portion CD to the expansion stage, while portions BC and DE correspond to the two transfer stages.

According to FIGURE 3, a refrigeration system for carrying into effect the second embodiment of the method consists of a device similar to that shown in FIGURE 1, except that the angular shift between the rotors is 180° and that the whole system is fed through a rotary high pressure-low pressure distributing- or timing valve 13.

The operation of the device is as follows: the two rotors are initially in the positions shown in FIGURE 3 and are revolving in the direction of arrows 16.

Then, chambers 1a, 1b are fed with high pressure by timing valve 13 and chambers 1b, 2b are simultaneously fed with low pressure.

During the first half-revolution (180°), the volume of chamber 1a is increased by a given amount, while the volume of chamber 2a is decreased by the same amount. Consequently, gas is transferred from chamber 2a to chamber 1a and flows successively through regenerator 7 where it is cooled, then through the thermal load 11 and finally into chamber 1a, but the pressure drop resulting from the cooling effect is compensated by external gas fed under the same pressure through the timing valve.

At the 180th degree of revolution, the timing valve is reversed to connect chambers 1a, 2a with the low-pressure side. This further stage is attended by gas expansion and cooling; while expanding, the gas flows through thermal load 11 and regenerator 7, transferring heat thereto.

Then, during the subsequent half-revolution of the motors, the volume of chamber 1a is decreased by a given amount, while the volume of chamber 2a is increased by the same amount. Consequently, cold residual gas is transferred through the thermal load, regenerator 7 and the timing valve 13. During this transfer, the thermal load and regenerator are cooled by the gas.

Upon completion of the revolution (i.e. 360°) the timing valve is reversed to feed high pressure to the circuit considered above, and so on.

The operation of the second circuit portion, consisting of chambers 1b, 2b, regenerator 8 and thermal load 11, is in all respects similar, but with a 180° angular shift relatively to the first circuit portion.

FIGURE 4 shows the variations in the volume of chamber 1a (curve V1a), the volume of chamber 2a (curve V2a) and the total volume (curve Vt) as a function of the angle of revolution of the rotors. As will be noticed, the rotor arrangement is such that the total volume Vt of the chambers is kept constant.

Referring to FIGURE 5, a device for carrying into effect the second embodiment of the refrigeration method consists of two cylindrical rooms 21, 22, within which two rotors 23, 24 are moving with a 180° relative shift. The blades are illustrated at 25, 26 and the regenerators 27, 28 are connected with the cylindrical rooms through thermal loads 29, 30.

The whole assembly is fed through the timing valve 33 and a motor 34 drives the rotors and timing distributing valve by means of shaft 35.

Figure 6:
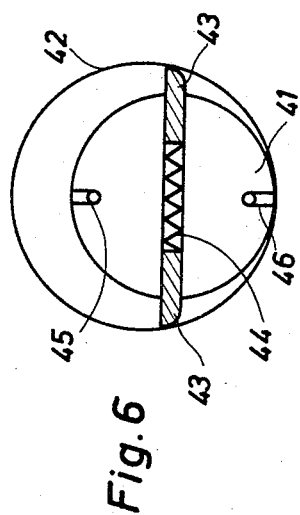

FIGURE 6 shows a rotor arrangement which may also be used in the devices according to the invention, and consists of a cylinder 41 movable within the cylindrical room 42.

The blades 43 are disposed within the rotor and are held by the spring 44 in constant engagement with the cylindrical walls of the room. The gases are fed through ports 45, 46.

Other revolving eccentric systems, diagrammatically shown in FIGURE 7, can also been used.

Figure 7A:
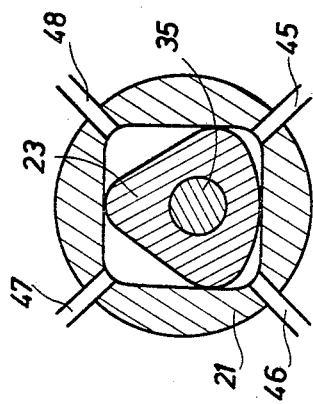

In FIGURE 7a, the stator 21 is of square internal shape, while the rotor 23 is triangular. Thus, four chambers of variable volumes are defined by rotor 23 and the gas flows into and from these chambers through ports 45, 46, 47, 48.

Figure 7C:
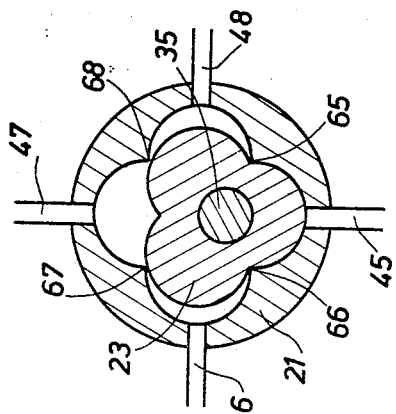
Figure 7B:
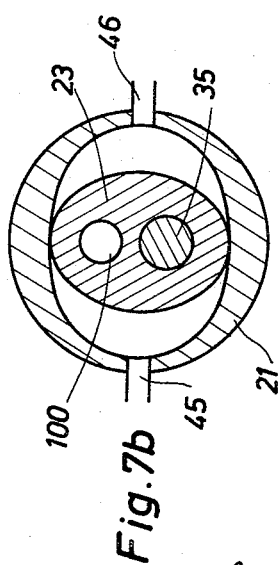

In FIGURE 7b, the stator 21 and rotor 23 are of elleptic shapes. Rotor 23 is eccentric with respect to shaft 35 and is dynamically balanced by means of a bore 100. The gas flow to and from the variable volume chambers is through two ports 45, 46.

In FIGURE 7c, the interior of the stator 21 is defined by four secant, consecutive arcs, while the rotor 23 is bounded by three arcs equal to the former, in symmetric consecutive arrangement. Thus, three variable volume chambers are defined by the rotor, which is successively rotating about axes 65, 66, 67 and 68. The gas flow into and from the chambers is through ports 45, 46, 47 and 48.

A refrigeration device with three refrigerating stages for carrying into effect the second embodiment of the method of the invention is shown in FIGURE 8. Said device consists of four cylindrical rooms 51, 52, 53 and 54, whereby the cylindrical room 51 has a volume equal to the sum of the volumes of cylindrical rooms 52, 53 and 54, since it is of triple length. The rotors of rooms 52, 53 and 54 are in phase and have a 180° angular shift with respect to the rotor of cylindrical room 51. Regenerators 55a, 55b, 56a, 56b, 57a, 57b and thermal loads 58, 59, 60 are arranged between the various cylindrical rooms. Finally, a high pressure-low pressure timing valve 61 feeds gas to the whole device.

The principle of operation of this device is similar to that of the device shown in FIGURE 3, but the chambers of cylindrical rooms 52, 53 and 54 are simultaneously filled by the corresponding chambers of cylindrical room 51. On the other hand, as a result of the gas flow through several successive regenerators, the cylindrical rooms 52, 53 and 54 are brought to respective temperatures $T_2$, $T_3$, $T_4$ such that:

$$T_2 > T_3 > T_4$$

According to FIGURE 9, a cylindrical room consists of a cylindrical casing 71 having a cover 72 secured thereon; fluid-tightness is ensured by a seal 73 which may be an O-ring in the case of a warm cylindrical room or an indium seal in the case of a cold cylindrical room.

The room itself is bounded by two shell halves 74, 75 (FIG. 10), attached to two circular rings 76, 77. Self-lubricating plates 78, 79 are interposed between the rings and shells.

The gases are fed through ducts 80, 81 which are held through the cover by means of members 82, 83; fluid-tightness is ensured by brazing at 84, 85. Each duct is divided into two ranches (FIGURE 10) to ensure suitable filling of the chambers in the cylindrical room.

According to FIGURE 9, the revolving system comprises an eccentric 89 with a bore 86 therethrough, mounted on ball-bearings 88, 89 and held by springs 90, 91 which are seated on abutments 92, 93. Mounted on this eccentric are two ball-bearings, of which the one, 94 is secured on the eccentric, while the other 95 is held at constant spacing from the former by a spacer 96 and a spring 97.

The revolving system further comprises a cylinder 98 mounted on the external races of ball-bearings 94, 95. Cylinder 98 forms the operative rotor part, in permanent sliding motion between the two lubrication plates 78, 79. This constant engagement is provided by leaf-springs such as 99.

Thus, the rotation of excentric 87 results in a circular translation or orbital motion of cylinder 98. The revolving system is dynamically balanced by means of a bore provided in excentric 87.

As seen in FIGURE 10, blades 101, 102 extend between both shell halves 74, 75, which are held apart by spacers such as 105 and secured together by screws such as 106. The blades are held in permanent engagement with rotor 98 by springs such as 108.

Therefore, the blades are free to slide between the two shell-halves and the frictional contact between the blades and shell-halves is made smooth by an intervening lubricating lining, e.g. of "Teflon" or any other similar material.

In FIGURE 11, a blade such as 111 is provided with two springs 112, 113 and with recesses 114, 115 adapted to accommodate the spacers.

According to FIGURE 12, two cylindrical rooms 121, 122 are connected together through two regenerators 123, 124, by means of a cylindrical tube 125 secured on the covers of the two rooms.

Mechanical coupling is effected by a lay-shaft 126 which is keyed to the shafts of both cylindrical rooms 127, 128.

A terminal liquefaction device for applying the second embodiment of the method of the invention is shown diagrammatically and in part on FIGURE 13. Said device consists of the two last cylindrical rooms 151, 152 and of the two regenerators 153, 154 which are connected to a timing or distributing valve 155 by ducts 134, 135 respectively. This timing valve is mounted on the common driving shaft 156. This valve is connected with a counter-current exchanger 159, through two buffer tanks 157, 158, by means of high-pressure duct 132 and low pressure duct 133. The buffer tanks are intended to damp out pulsation caused by the timing-valve 155.

Finally, a storage tank 161 is provided to collect the gas which is liquefied after passing through an expansion valve 160.

The operation of the device is as follows: during its rotation, timing or distributing valve 155 connects the high-pressure side of the apparatus with buffer tank 157, exchanger 159 and expansion valve 160. Thus, a fraction of the gases is liquefied and stored in tank 161, while the non-liquefied fraction is returned to the low-pressure side of the apparatus through exchanger 159, buffer-tank 158 and timing valve 155.

As shown in FIGURES 14–17, the timing distributing valve 155 consists of a fixed cylinder 131 into which open the low-pressure duct 133, high-pressure duct 132 and the ducts 134, 135 for connection with the two parallel refrigeration circuits. Circular grooves 136, 137 provided in cylinder 131 are in communication with the high-pressure and low-pressure ducts. The driving shaft 156 of the refrigeration apparatus has circular grooves 139, 140 registering with the circular grooves 136, 137 of the fixed cylinder and ports or recesses 141, 142 for alternate connection of each feed duct 134, 135 either with the high-pressure or with the low-pressure duct.

The operation of the device is as follows: when the shaft is in the position shown in FIGURE 14, the high-pressure duct is brought into communication with duct 135 through groove 139 and recess 142, while the low-pressure duct 133 is brought into communication with duct 134 through groove 140 and recess 141.

After a half-revolution (180°) of the shaft, the supply is reversed, i.e. duct 135 is brought into communication with low-pressure duct 133, while duct 134 is brought into communication with high-pressure duct 132, and so on. The angular setting of timing valve 155 on shaft 156 is such that the high-pressure duct is only on when the corresponding circuit is put under high pressure.

A terminal liquefaction device for carrying into effect the first embodiment of the method of the invention has the same mode of operation, but subject to the addition of an external gas source (container or compressor) to make for the liquefied gas output when said output is higher than the vaporized gas output. However, in the particularly favorable case where the liquefied gas output is exactly equal to the vaporized gas output (the device acting as a liquefaction-refrigeration unit), then the external source may be dispensed with as soon as permanent operating conditions are reached.

What I claim is:

1. In an apparatus for refrigeration and/or liquefaction through expansion of a gas, at least two cylindrical rooms the one being a cold room held at a low temperature and the other a warm room held at substantially ambient temperature, a shaft coaxial with said cylindrical rooms, an eccentric member positioned in each cylindrical room on said shaft for rotation about a common axis, said eccentric members being shifted in phase in the corresponding room, means movable relatively to the eccentric members within the respective cold and warm rooms to permanently form simultaneously at least two chambers of variable volume in each room, means to connect each said cold and warm chambers to respectively one warm and cold chambers, a positive thermal source disposed between the cold and warm rooms, respectively, a regenerator mounted between a cold chamber and a warm chamber, means to feed gas to the respective chambers of variable volume.

2. In an apparatus for refrigeration and/or liquefaction through expansion of a gas, at least one cold cylindrical room and one warm cylindrical room, a common shaft for said rooms, said rooms having a common axis parallel to said shaft, means to rotate said shaft on said axis, a first rotor in the cold room and a second rotor in the warm room, said rotors being disposed eccentric relative to said axis and shifted relatively one to the other, blades mounted movably relative to the respective rotors and dividing the respective rooms in two chambers having a variable volume, means connecting each of said two chambers of the cold room to a respective one of said two chambers of the warm room, a positive thermal load connected between the rooms, a regenerator connected to each chamber of the cold room and to each chamber of the warm room, connection from each chamber to the other passing through the thermal load.

3. In an apparatus according to claim 2, together with a heat evacuator between each regenerator and one of the rooms.

4. In an apparatus according to claim 2, wherein the blades are elastically projected into the rooms and applied onto the respective rotors.

5. In an apparatus for refrigeration and/or liquefaction through expansion of a gas, one cylindrical cold room, one cylindrical warm room, a common shaft coaxial with said rooms, an eccentric rotor in each cylindrical room fixed on said shaft with an angular shift between said rotors, each room having a series of blades elastically mounted in the room and tightly urged against the respective rotors so as to form in the corresponding room at least two chambers of continuously variable volume, a connection between each one of said chambers of the warm room and a respective one of said chambers of the cold room, a regenerator inserted into each of these of the cold room, a regenerator inserted into each of these connections so as to provide at least two separate circuits for the gas, means to put gas respectively under high and low pressure in said chambers, each circuit having a connection to said means of pressurising the gas and valve means to alternately connect said means to the end and to the other circuits.

6. In an apparatus according to claim 1, the said means movable relative to the eccentric members are mounted elastically in said members and urged against the respective room.

7. In an apparatus according to claim 1, the connections between the cold and warm rooms are disposed at the opposite ends of a diameter of the rooms.

8. The apparatus of claim 5 wherein a positive thermal load is coupled between said rooms.

9. The apparatus of claim 5 wherein an expansion valve and a liquid storage tank are connected to said valve means for sequential connection to said circuit.

References Cited

UNITED STATES PATENTS 3,370,418   2/1968   Kelly _____ 62—6 X
3,407,593   10/1968  Kelly _____ 60—24

WILLIAM J. WYE, Primary Examiner